Patented Oct. 13, 1936

2,057,306

UNITED STATES PATENT OFFICE 2,057,306

ALUMINUM CATALYST

Friedrich Martin, Oberhausen, Walter Grimme, Oberhausen-Sterkrade, and Alfred Köppelmann, Oberhausen-Holten, Germany No Drawing. Application April 18, 1935, Serial No. 17,132. In Germany April 24, 1934

12 Claims. (Cl. 23—93)

Our invention relates to catalysts and more especially to the well known aluminum chloride catalyst used in quite a number of reactions including the so-called Friedel-Crafts reaction, cracking and hydrogenation reactions etc. It is an object of our invention to provide means whereby an aluminum chloride catalyst can be produced which is more efficient than similar catalysts hitherto in use.

Our invention also relates to the reactions carried through with the new catalyst and quite especially to reactions of the Friedel-Crafts type, which are greatly improved by the use of an aluminum chloride produced in accordance with this invention.

With this and other objects in view we are now going to describe our invention and the way in which it is carried out.

As is well known, reactions of the Friedel-Crafts type, but also hydrogenation reactions require the use of an anhydrous aluminum chloride and it is equally known that in the production and storage of this substance considerable difficulties are encountered.

We have now found that there is no necessity for using the ready made aluminum chloride of commerce, but that it is very advantageous, if starting a reaction of the Friedel-Crafts type, to produce the aluminum chloride catalyst in situ, i. e. in the reaction mixture.

The Friedel-Crafts reaction is the reaction between a cyclic hydrocarbon, which may be substituted, and a hydrocarbon containing halogen or an unsaturated hydrocarbon or the chloride or anhydrid of an acid, and this reaction is started and promoted by the aluminum chloride catalyst.

Of the aromatic hydrocarbons which enter into this reaction, benzene and its homologues including toluene and xylene, further naphthalene, anthracene and their homologues may be used. The reaction is also carried through with incompletely hydrogenated aromatic hydrocarbons such as tetralin, with aryl-substituted aliphatic hydrocarbons, such as diphenylmethane, dibenzyl, bi-phenyl and its homologues, such as ditolyl. The reactions may further be varied by replacing the aromatic hydrocarbon by its alkoxy derivatives, i. e. the ethers of univalent or polyvalent phenols, such as anisol or naphthene ether; one or more hydrogen atoms in the nucleus of the aromatic hydrocarbon may be substituted by halogen. Instead of an aromatic hydrocarbon thiophene may also be used.

If reacting an aromatic hydrocarbon with a chlorinated aliphatic hydrocarbon such as methylchloride, ethylchloride etc., there are obtained aromatic hydrocarbons with an aliphatic side chain. Thus the reaction between benzene and ethylchloride will yield ethylbenzene. Instead of alkylhalides one may also use aralkylhalides, i. e. aromatic hydrocarbons substituted with halogen in the side chain. Thus for instance if reacting benzene with benzylchloride, diphenylmethane is obtained. An aromatic hydrocarbon may further be reacted with an unsaturated aliphatic hydrocarbon, such as ethylene, propylene or butylene, whereby aromatic hydrocarbons with a side chain are obtained, benzene and ethylene furnishing ethylbenzene, benzene and propylene, propylbenzene. On the other hand unsaturated aromatic hydrocarbons may be used having an unsaturated side chain, such as styrene, which when reacted with benzene leads to the formation of diphenylethane.

When acting on an aromatic hydrocarbon with an acid chloride or an acid anhydrid, one obtains a keton. The acid chloride may be substituted by halogen or the nitro group.

Hitherto the reaction between substances of the kind aforesaid was carried out in the presence of anhydrous aluminum chloride produced in any suitable manner by acting on aluminum metal with hydrochloric acid. If acting on the metal with hydrochloric acid gas in the absence of any solvent, the aluminum chloride will form at a high temperature above 100 and even 200° C. If acting on aluminum metal with the hydrochloric acid gas at normal or moderately raised temperatures no reaction will occur even though the aluminum may be suspended in benzene, benzine, carbon-disulfide or the like. The reaction between the metal and the acid may be influenced catalytically by a mixture of mercuric chloride and iodine. However, the aluminum chloride thus formed is soiled with foreign matter and must be purified before being put to use.

We have now found that if hydrogen chloride is made to act on aluminum metal in the presence of some aluminum chloride previously formed, the reaction being carried through in a liquid or mixture of liquids capable of reacting according to the Friedel-Crafts reaction, the interaction between the metal and the acid will be promoted to a surprising degree.

Thus for instance, if aluminum powder is suspended in benzene and hydrogen chloride gas is introduced into the suspension, no reaction will take place between the metal and the acids. However if a small quantity, for instance not exceeding 3% by weight of the metal, of anhydrous sublimated aluminum chloride is added, the mixture will heat up and a vigorous formation of hydrogen will set in soon after the aluminum chloride has been added. After a short period of time the aluminum metal will have disappeared, being converted into aluminum chloride. At a temperature which will as a rule be between 50 and 70° C., but which may in some cases be raised up to 250° C., the velocity of the reaction is greatly increased. Obviously the appropriate temperature will depend in each individual case from the boiling temperature of the components of the reaction mixture and from the pressure. When operating at ordinary pressure and using benzene as one of the components of a Friedel-Crafts reaction, a temperature of 70° C. will practically not be exceeded. If operating under increased pressure, for instance when producing ethyl benzene by the interaction of benzene, ethylene and aluminum chloride, materially higher temperatures may be found useful.

We have found it particularly useful to produce the aluminum chloride in the course of a reaction of the Friedel-Crafts type or, at least, to produce it in a medium forming one of the constituents of such a reaction mixture. In thus proceeding we obtain an aluminum chloride possessing a surprisingly great reactivity and which is capable of favorably influencing the reaction, whether of the Friedel-Crafts type or of the cracking or hydrogenation type, which it is intended to carry through with its use.

In the practice of our invention we cause aluminum powder to react with dry hydrogen chloride gas in the presence of an aromatic hydrocarbon or some other liquid capable of participating in a reaction according to the Friedel-Crafts type.

We have found that the reaction between the aluminum and the hydrogen chloride will set in only if a catalyst is present, which may either be some aluminum chloride previously formed or a double salt of the aluminum chloride such as potassium aluminum chloride or a double compound of aluminum chloride with an unsaturated aliphatic or aromatic hydrocarbon such as ethylene, propylene etc. or ethylbenzene. Of such double compounds only the combination of 1 molecule ethylene and 1 molecule aluminum chloride constituted according to the formula AlCl$_3$.C$_2$H$_4$ has been described.

As soon as a small quantity of such a catalyst is added to the mixture, a vigorous generation of hydrogen will set in and the aluminum metal is dissolved, aluminum chloride being formed.

We have found it particularly useful to add a double compound of aluminum chloride and a hydrocarbon, since these compounds have the character of oils, which are capable of dissolving the freshly formed aluminum chloride, which is thus removed from the aluminum metal, so that a bright metallic surface is always exposed to the action of the hydrogen chloride gas.

The conversion of the aluminum metal into aluminum chloride will as a rule be terminated after the lapse of a few hours, say from 2 to 5 hours.

In practicing our invention we may for instance proceed as follows:

*Example 1*

15 grams aluminum powder and 1 to 2 grams anhydrous sublimated aluminum chloride are entered into 300 cubic centimetres dry benzene and dry hydrogen chloride gas is introduced under vigorous stirring. The temperature of the reaction mixture gradually rises to 40 to 50° C. and hydrogen is developed. After the lapse of 5 hours about 75% of the aluminum metal has been converted into yellow pulverulent aluminum chloride. The conversion of the aluminum, accompanied by the development of hydrogen, will continue for some time after the introduction of hydrogen chloride has been stopped.

*Example 2*

If the mixture described with reference to Example 1 is heated from the beginning to about 70° C. under the reflux condenser, about 80% of the aluminum metal will have been converted into the anhydrous chloride after the lapse of not more than 2 hours.

*Example 3*

If the pure aluminum chloride in the reaction mixture described with reference to Example 1 is replaced by 3 grams potassium aluminum chloride, the conversion of the metal into the chloride will occur similarly as described with reference to Examples 1 and 2.

*Example 4*

If the pure aluminum chloride is replaced by 3 grams of an oily double compound formed from aluminum chloride and ethyl benzene, the reaction between the aluminum metal and the hydrogen chloride will proceed particularly quickly.

*Example 5*

Into a mixture of 500 grams benzene, 15 grams aluminum powder and 2 grams sublimated aluminum chloride hydrogen chloride gas and ethylene gas are introduced simultaneously under stirring. The temperature of the reaction mixture rises and instead of the solid aluminum chloride there is formed directly the oily double compound of aluminum chloride and ethyl benzene, which is capable of influencing catalytically the further absorption of ethylene and the formation of ethyl benzene. In this case the aluminum metal is completely dissolved after the lapse of 2 hours.

*Example 6*

Into a mixture of 200 grams benzene, 30 grams aluminum metal and 4 grams aluminum chloride, hydrogen chloride gas is introduced under vigorous stirring and heating, until about one half of the metal has been converted into the chloride, whereupon 40 grams acetylchloride are added. The hydrochloric acid, liberated in the vehement reaction which now sets in, quickly dissolves the bulk of the aluminum metal which had remained over. From the product of reaction 25 grams acetophenon can be recovered.

The above description will have shown that by causing the aluminum chloride required as a catalyst in the Friedel-Crafts and other reactions to be formed in situ, i. e. in a medium capable of entering one of these reactions and more especially the Friedel-Crafts reaction, the conversion of the metal into the chloride is greatly expedited and a catalyst obtained, the reactive properties of which far exceed those of the anhydrous aluminum chloride produced according to old methods.

Quite particularly the addition products of aluminum chloride and one of the hydrocarbons here in question have proved to be particularly suitable for use in the conversion of the aluminum metal into the chloride.

While in the examples benzene has been used, obviously all the other constituents of a Friedel-Crafts reaction mixture may be used to suspend the aluminum in. We may as well use the homologues of benzene including toluene and xylene, as also compounds containing a combination of nuclei, such as naphthalene, anthracene and their homologues, incompletely hydrogenated aromatic hydrocarbons such as tetrahydronaphthalene (tetralin) or aliphatic hydrocarbons substituted by aromatic radicles such as diphenylmethane or diphenyl and the homologues of these hydrocarbons. Instead of the hydrocarbons themselves we may use their alkoxy derivatives or their halogen substitution products or thiophene.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim in the present application to any modification not covered by these claims is expressly reserved.

We claim:—

1. The method of producing a catalyst which comprises reacting aluminum metal with dry hydrogen chloride gas in the presence initially of a small quantity of an aluminum chloride catalyst in a medium capable of undergoing a reaction of the Friedel-Crafts type.

2. The method of producing a catalyst which comprisese reacting aluminum metal with dry hydrogen chloride gas in the presence initially of a small quantity of anhydrous aluminum chloride in a medium capable of undergoing a reaction of the Friedel-Crafts type.

3. The method of producing a catalyst which comprises reacting aluminum metal with dry hydrogen chloride gas in the presence initially of a small quantity of a double salt of aluminum chloride in a medium capable of undergoing a reaction of the Friedel-Crafts type.

4. The method of producing a catalyst which comprises reacting aluminum metal with dry hydrogen chloride gas in the presence initially of a small quantity of potassium aluminum chloride in a medium capable of undergoing a reaction of the Friedel-Crafts type.

5. The method of producing a catalyst which comprises reacting aluminum metal with dry hydrogen chloride gas in the presence initially of a small quantity of an addition compound of aluminum chloride and an unsaturated hydrocarbon in a medium capable of undergoing a reaction of the Friedel-Crafts type.

6. The method of producing a catalyst which comprises reacting aluminum metal with dry hydrogen chloride gas in the presence initially of a small quantity of aluminum chloride and an unsaturated aliphatic hydrocarbon in a medium capable of undergoing a reaction of the Friedel-Crafts type.

7. The method of producing a catalyst which comprises reacting aluminum metal with dry hydrogen chloride gas in the presence initially of a small quantity of aluminum chloride and an unsaturated aromatic hydrocarbon in a medium capable of undergoing a reaction of the Friedel-Crafts type.

8. The method of producing a catalyst which comprises reacting aluminum metal in the presence initially of a small quantity of aluminum chloride with dry hydrogen chloride gas in a compound of the benzene series.

9. The method of producing a catalyst which comprises reacting aluminum metal in the presence initially of a small quantity of aluminum chloride with dry hydrogen chloride gas in a compound of the naphthalene series.

10. The method of producing a catalyst which comprises reacting aluminum metal in the presence initially of a small quantity of aluminum chloride with dry hydrogen chloride gas in a compound of the anthracene series.

11. The method of producing a catalyst which comprises reacting aluminum metal in the presence initially of a small quantity of aluminum chloride with dry hydrogen chloride gas in a Friedel-Crafts reaction mixture.

12. The method of producing a catalyst which comprises reacting aluminum metal in the presence initially of a small quantity of aluminum chloride with dry hydrogen chloride gas in a mixture of compounds undergoing a reaction of the Friedel-Crafts type.

FRIEDRICH MARTIN.
WALTER GRIMME.
ALFRED KÖPPELMANN.